United States Patent
Jacobs (10) Patent No.: US 8,400,564 B2
(45) Date of Patent: Mar. 19, 2013

(54) IMAGE CAPTURE

(75) Inventor: Joel B. Jacobs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 12/772,805

(22) Filed: May 3, 2010

(65) Prior Publication Data

US 2011/0267478 A1 Nov. 3, 2011

(51) Int. Cl.
*H04N 5/225* (2006.01)
*H04N 5/222* (2006.01)
*G09G 5/00* (2006.01)

(52) U.S. Cl. ............... 348/376; 348/207.1; 348/333.12; 345/1.3

(58) Field of Classification Search .............. 348/207.1, 348/376, 1.3, 333.01, 333.11, 333.12; 345/1.3
See application file for complete search history.

(56) References Cited

U.S. PATENT DOCUMENTS

| 7,046,404 | B2 | 5/2006 | Cheatle et al. | |
|---|---|---|---|---|
| 7,616,976 | B2 | 11/2009 | Fourquin et al. | |
| 8,120,657 | B2 * | 2/2012 | Li et al. | 348/207.1 |
| 2003/0048271 | A1 | 3/2003 | Liess et al. | |
| 2006/0103893 | A1 | 5/2006 | Azimi et al. | |
| 2006/0164526 | A1 * | 7/2006 | Suzuki et al. | 348/239 |
| 2006/0183505 | A1 * | 8/2006 | Willrich | 455/566 |
| 2008/0002049 | A1 | 1/2008 | Saito | |
| 2009/0059043 | A1 | 3/2009 | Demuynck | |
| 2009/0167934 | A1 | 7/2009 | Gupta | |
| 2009/0262209 | A1 | 10/2009 | Pai et al. | |
| 2009/0322706 | A1 * | 12/2009 | Austin | 345/175 |
| 2010/0079369 | A1 * | 4/2010 | Hartmann et al. | 345/156 |
| 2010/0085274 | A1 * | 4/2010 | Kilpatrick et al. | 345/1.3 |
| 2011/0037952 | A1 * | 2/2011 | LaDuke et al. | 353/28 |
| 2012/0084675 | A1 * | 4/2012 | Sirpal et al. | 715/761 |

FOREIGN PATENT DOCUMENTS

| KR | 200205201 | 12/2000 |
|---|---|---|
| KR | 20090021902 | 3/2009 |
| WO | WO 2007081290 A1 * | 7/2007 |

OTHER PUBLICATIONS

Pirvu, Dragos., "What Apple Tablet? Here is the Microsoft Courier Dual-Screen Booklet", Retrieved at << http://www.softsailor.com/news/8047-what-apple-tablet-here-is-the-microsoft-courier-dual-screen-booklet.html >>, Sep. 23, 2009, pp. 4.

(Continued)

*Primary Examiner* — Tuan Ho
*Assistant Examiner* — Shahbaz Nazrul
(74) *Attorney, Agent, or Firm* — Wolfe-SBMC (57) ABSTRACT

Image capture techniques are described. In implementations, an image is captured, by an image capture device of a computing device, of an object that is disposed on a surface of a first display device of the computing device. The computing device includes a first housing that includes the first display device and a second housing that is rotatable attached to the first housing and that includes a second display device. The captured image is displayed on at least one of the first display device or the second display device.

14 Claims, 8 Drawing Sheets

OTHER PUBLICATIONS

"SilverFast DC-Virtual Light Table—6.0.2d37", Retrieved at << http://www.versiontracker.com/dyn/moreinfo/macosx/18584&vid=114657 >>, Retrieved Date: Apr. 5, 2010, pp. 3.

"Perspective Correction", Retrieved at << http://www.dcviews.com/tutors-t.htm?tt55412 >>, Retrieved Date: Apr. 5, 2010, p. 1. "I-Tech Virtual Laser Keyboard!", Retrieved at << http://www.virtual-laser-keyboard.com/ >>, Retrieved Date: Apr. 1, 2010, pp. 4.

"PCT Search Report and Written Opinion", Application No. PCT/US2011/034709, (Dec. 26, 2011), 8 pages.

* cited by examiner

IMAGE CAPTURE

BACKGROUND

Users deal with paper that contains a wide variety of information in everyday life. For example, a business user may receive business cards, receipts, tickets, product literature, scheduling information, confirmations, and so on. Likewise, a home user may also deal with receipts, receive written reports involving children, be given a written shopping list, and so on. Consequently, it may be difficult for a person to maintain this variety of paper, which may result in the user losing some of the pieces of paper, the paper being damaged, and so forth.

SUMMARY

Image capture techniques are described. In implementations, an image is captured, by an image capture device of a computing device, of an object that is disposed on a surface of a first display device of the computing device. The computing device includes a first housing that includes the first display device and a second housing that is rotatable attached to the first housing and that includes a second display device. The captured image is displayed on at least one of the first display device or the second display device.

In implementations, a frame is projected on a surface outside of a computing device that describes an area within which an object is to be positioned to capture an image of the object by the computing device. The image is captured by the computing device using an image capture device.

In implementations, a computing device includes a first housing that includes a first display device and a second housing. The second housing is rotatable attached to the first housing and includes a second display device and an image capture device. One or more modules that are disposed within at least one of the first or second housings, the modules configured to capture images of an object disposed on a surface of the first display device using the image capture device and cause the captured images to be displayed in real time on the second display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Users may employ computing devices, and more particularly image capture devices of computing devices, to capture a variety of images. For example, the user may employ the image capture device to take a photo. However, use of traditional computing devices to capture images may make it difficult for a user to frame a subject, keep the image capture device "still" enough to capture an image having sufficient quality, keep an imaging plane of the image capture device parallel to an object being photographed, and so on.

Image capture techniques are described. In implementations, a computing device is configured to project a frame (e.g., via a laser) onto a surface that is adjacent to the computing device. The frame may be used to describe an area within which an image is to be captured, thus readily identifying to a user "where" an object is to be positioned for an image of the object to be captured. The image may then be captured by the image capture device and processed (e.g., correction for skew) for display on a display device of the computing device. A variety of other examples of projecting a frame are also contemplated, further discussion of which may be found in relation to FIGS. 4-6 and 8.

In additional implementations, the computing device may be configured as a dual-display device. For example, the computing device may have first and second housings, each having a corresponding display device, that are rotatable attached. An object that is to be a subject of an image capture may be placed on a surface of one of the housings, and an image may be captured. Through use of the dual-display device, however, a variety of functionality may be employed in relation to the image capture. For instance, a captured image may be displayed on the other display device (which does not have the object placed on its surface) in real time, such as to aid a user to position the object and provide a real time preview of the image capture. In another instance, a captured image may "remain" on the display device where the object was placed such that after the object is moved, the captured image is displayed where the object was placed on the display device. A variety of other examples of dual-display device image capture techniques are also contemplated, further discussion of which may be found in relation to FIGS. 2-3 and 7.

In the following discussion, an example environment is first described that is operable to employ the image capture techniques described herein. Example procedures and illustrations of a computing device assuming different postures to capture images are then described, which may be employed in the example environment as well as in other environments. Accordingly, the example environment is not limited to performing the example procedures. Likewise, the example procedures are not limited to implementation in the example environment or by the example computing devices.

Example Environment

Figure 1:
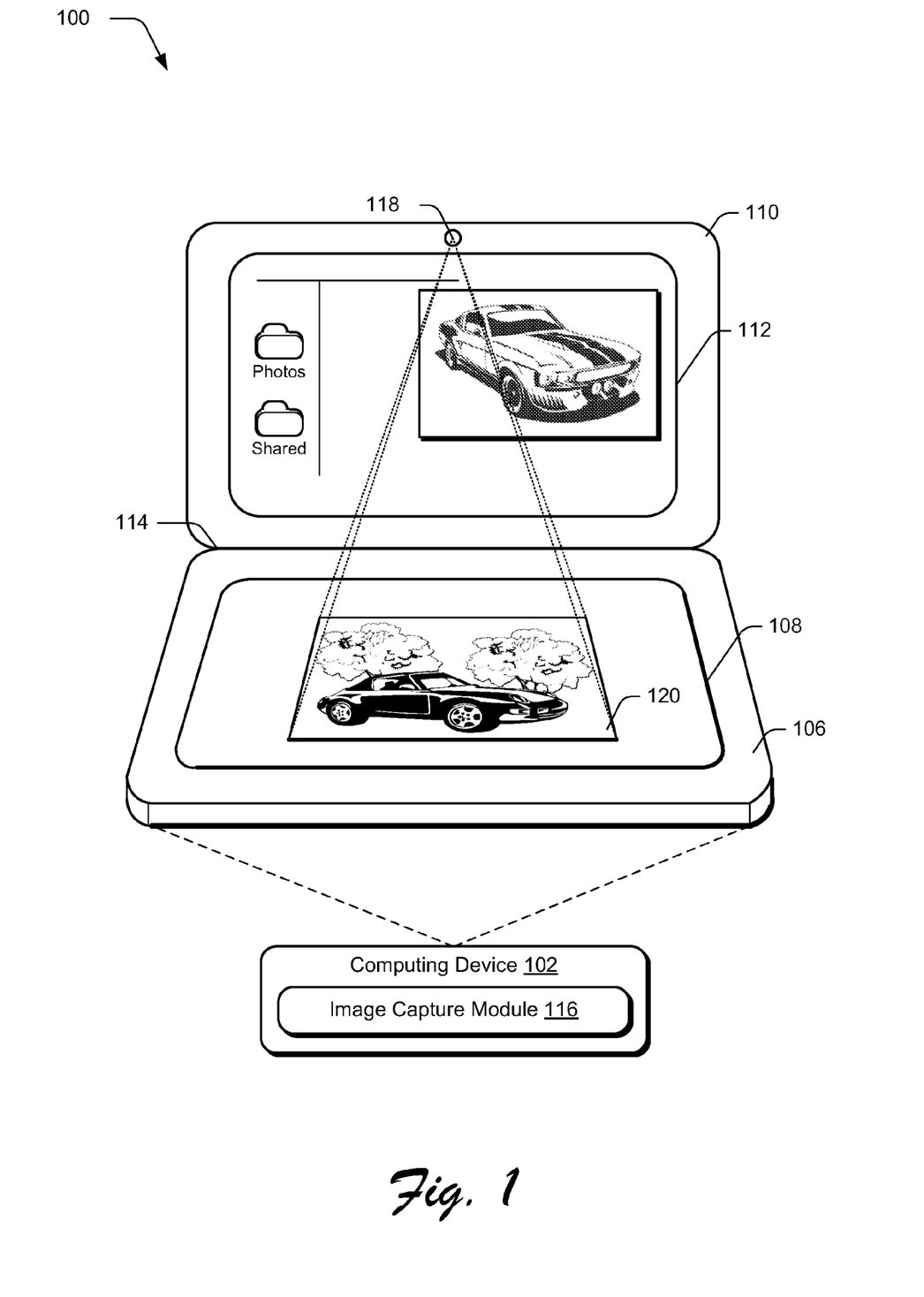
FIG. 1 is an illustration of an environment in an example implementation that is operable to employ image capture techniques.

FIG. 1 is an illustration of an environment 100 in an example implementation that is operable to employ image capture techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIGS. 2-6 and 9. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 may be implemented with one or more sensors, processors, communication components, data inputs, memory components, processing and control circuits, integrated display devices, and/or a content rendering system. The computing device 102 can also be implemented with any number and combination of differing components as described with reference to the example device shown in FIG. 9. In the example environment 100, computing device 102 is implemented as a mobile dual-display computing device that includes at least two integrated display devices, such as LCDs, OLEDs, or other similar display systems.

As illustrated, the computing device 102 has a first housing 106 that includes an integrated first display 108. The computing device 102 also has a second housing 110 that includes an integrated second display 112. A binding system 114 is also included (a rotatable mechanism such as a hinge, pivot, and so on), which movably connects the first housing 106 to the second housing 110. In an embodiment, the binding system 114 can be implemented as a multi-axis hinge that movably connects the first housing 106 to rotate in at least two different directions relative to the second housing 110. Alternatively or in addition, the binding system 114 can include an internal drive mechanism to position the first housing 106 and/or the second housing 110 in one or more various display postures as illustrated in FIGS. 1-6. Alternatively or in addition, the binding system 114 may also include passive mechanical positioned detents to retain the two halves in various relative postures as further described below.

As illustrated in FIG. 1, for instance, the first display 108 and the second display 112 are positioned to display in a landscape mode to assume a laptop display posture. In this posture, a position angle between the first display and the second display is less than one-hundred and eighty degrees (180°). This display configuration resembles how a laptop computer is commonly used, and in an implementation, the first display device 108 can be utilized to display a touch-screen keyboard and the second display device 112 may display an application or other type of user interface.

Figure 4:
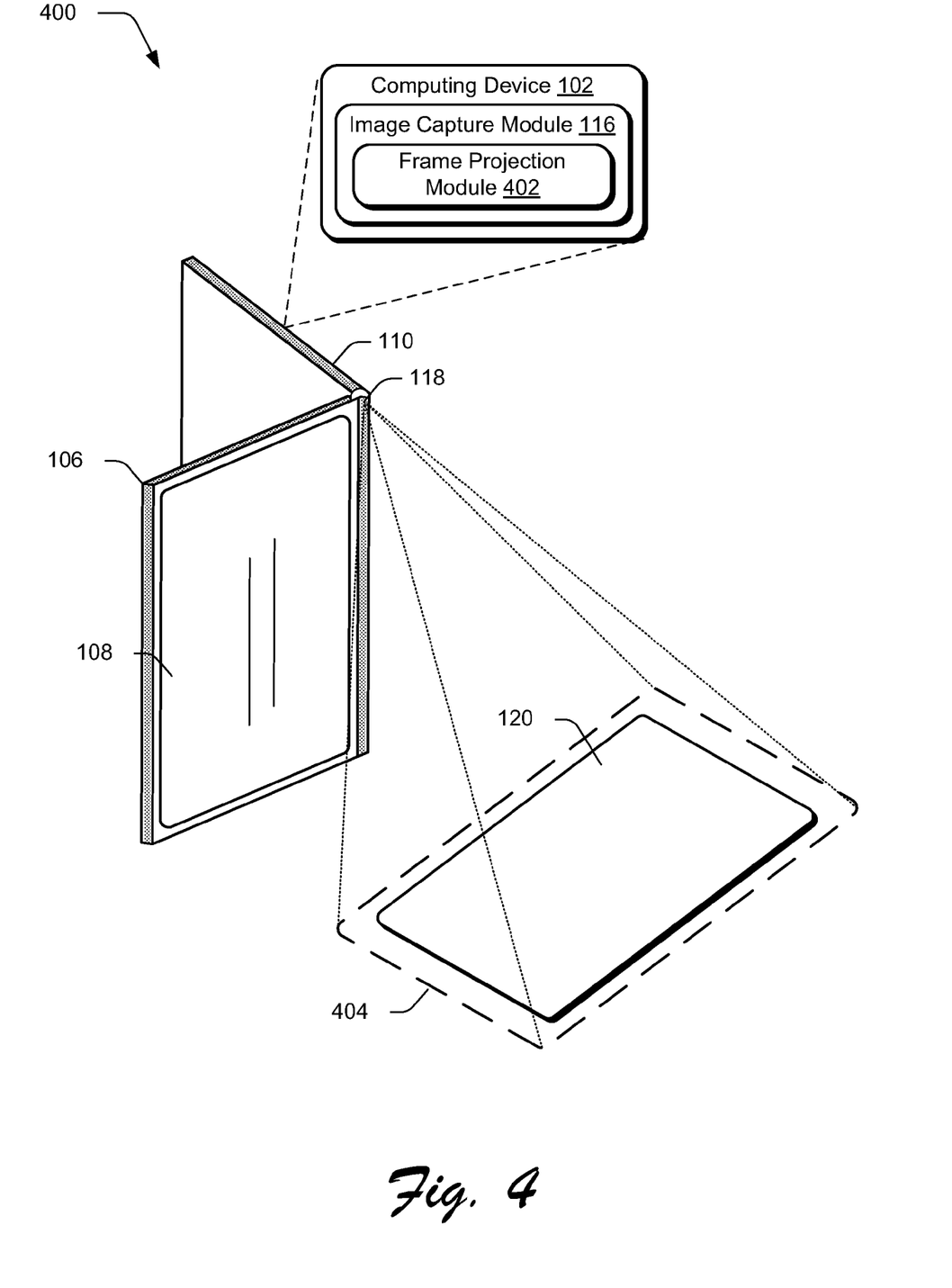
FIG. 4 is an illustration of an example system in which a frame is projected outside of the computing device of FIG. 1 to indicate an area within which an object is to be placed to capture an image of the object.

In a tripod posture as illustrated in the example system 400 of FIG. 4, the first display device 108 of the first housing 106 and the second display device (not shown) of the second housing 112 are positioned to display in a portrait mode, and a position angle between the display devices of the first housing 106 and the second housing 110 is less than one hundred and eighty degrees (180°). This display configuration resembles a book opened for reading (with the display devices shown as the cover of the book).

Figure 5:
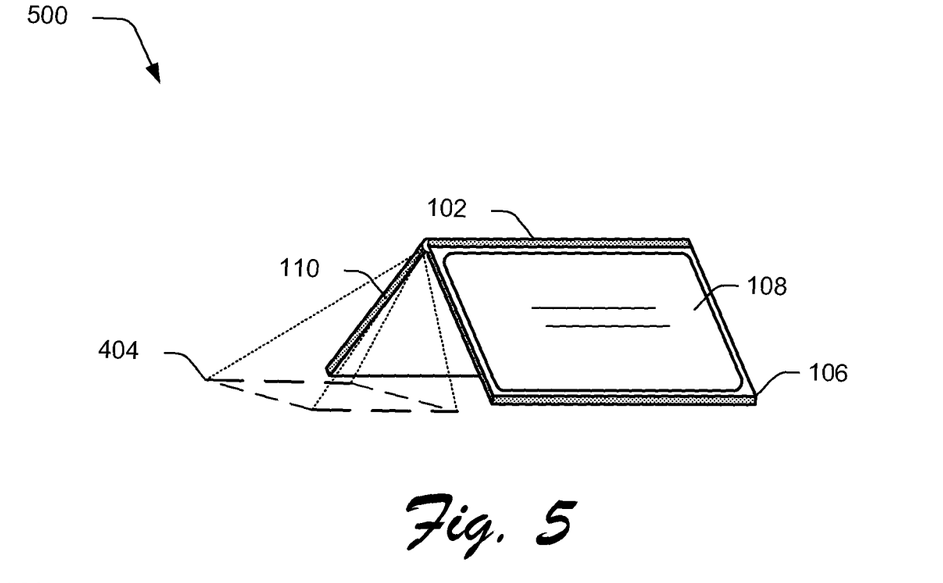
FIG. 5 is an illustration of an example system in which the computing device of FIG. 1 is illustrated as assuming a presentation display posture and projecting a frame to indicate an area within which an image of an object may be captured.

In a presentation display posture as illustrated in an example system 500 of FIG. 5, the first display 108 of the first housing 106 and the second display (not shown) of the second housing 110 are positioned to display in approximate opposing directions, and a position angle between the first and second displays is greater than one-hundred and eighty degrees (180°) and less than three-hundred and sixty degrees (360°). This display configuration can be used to display pictures, such as when the device is placed on a desk, and/or provides a divider between users that are sitting across from each other. The first display 108 and the second display 112 can be positioned to display in a landscape mode as illustrated in this example. Alternatively, the first display 108 and the second display 112 can be positioned to display in a portrait mode as illustrated in the example system 400 of FIG. 4. A variety of other postures are also contemplated and as such these examples are not to be taken as an exhaustive list.

Returning back to FIG. 1, the computing device 102 is further illustrated as including an image-capture module 116. The image capture module 116 is representative of functionality of the computing device 102 relating to image capture techniques. For example, the image capture module 116 may employ an image capture device 118 to capture an image of an object 120 placed on a surface of the first display device 108. Phantom lines are illustrated in FIG. 1 from the image capture device 118 to the object 120 to indicate capture of an image of the object 120. The image capture device 118 may be implemented in a variety of ways, such as to be "shared" with other uses (e.g., for video conferencing), implemented as a dedicated device, and so on. A variety of different image capture techniques may be employed by the image capture module 116, further discussion of which may be found in relation to the following figures.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processing system (e.g., CPU or CPUs). The program code can be stored in one or more computer readable memory devices. The features of the image capture techniques described below are platform-independent, meaning that the techniques may be implemented on a variety of commercial computing platforms having a variety of processors.

Figure 2:
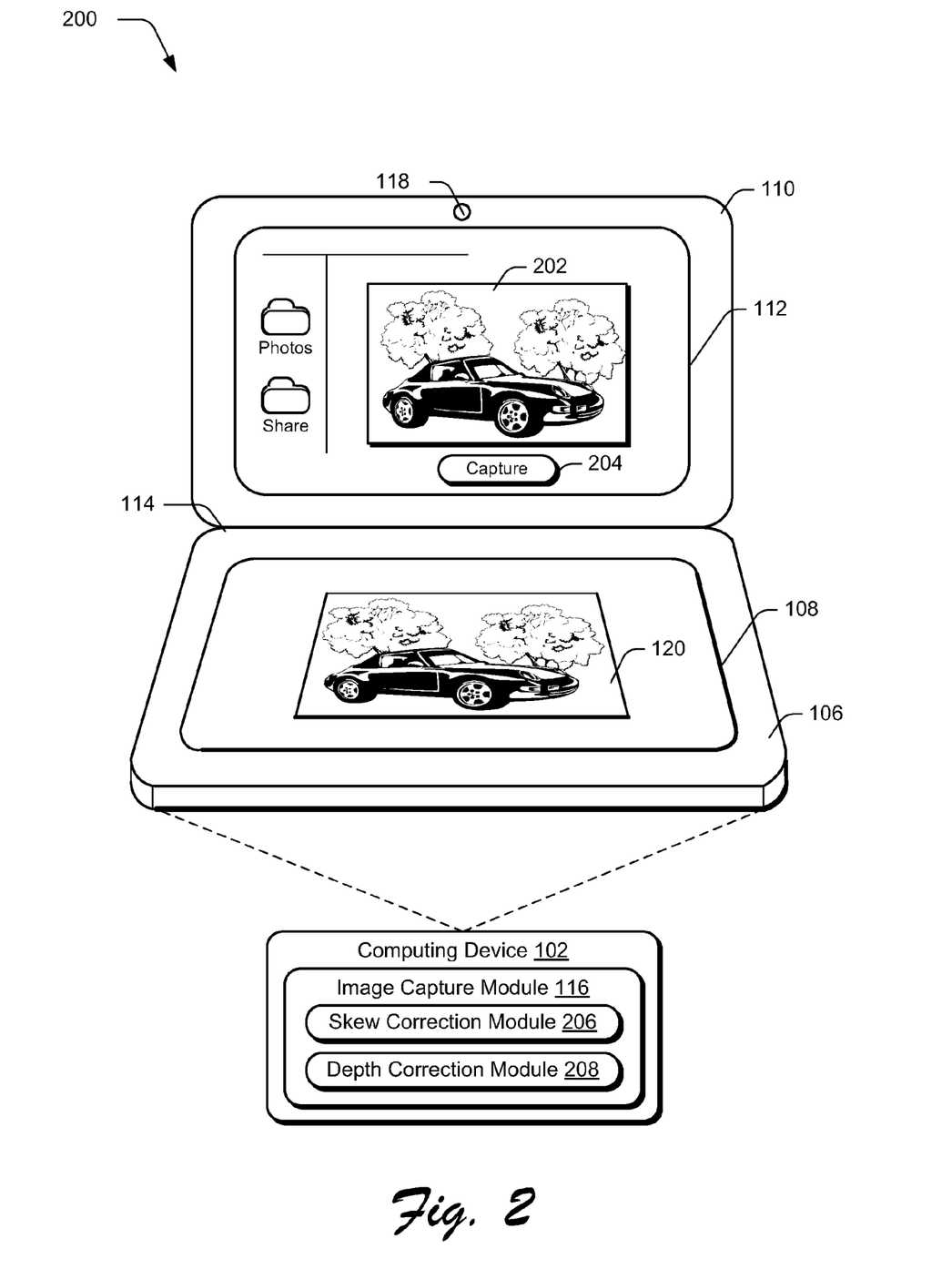
FIG. 2 is an illustration of an example system showing a real-time preview displayed on a second display device of an image of an object, the object disposed on a first display device of a computing device of FIG. 1.

FIG. 2 depicts a system 200 in an example implementation in which a real-time preview is provided on a second display device of an image of an object, the object disposed on the first display device. Like FIG. 1, in this example the object 120 is placed on a surface of the first display device 108. The object 120 in this example is a paper photograph of a car.

An image 202 of the object 120 is captured by the image capture device 118 and displayed on the second display device 112 included as part of the second housing 110. In implementations, the image 202 may be provided by the image capture module 116 as a real time preview of the image that may currently be captured of the object 120 positioned on the surface of the first display device 108.

In this way, a user may reposition the object 120, specify settings (e.g., zoom), and so on of the image 202 and be informed in real time as to the effect of those changes on the image 202. The user may then cause the image 202 to be captured for storage in a memory device of the computing device 102, such as by selecting a portion 204 of a user interface to "capture" the image 202 once the image 202 is deemed acceptable by a user of the computing device 102.

The image capture module 116 may also employ a variety of functionality to process the image 202. For example, the image capture module 116 may include functionality to correct perspective (e.g., automatically and without user intervention), such as through a skew correction module 206. The skew correction module 206 is representative of functionality to correct skew caused by the object not being parallel to an imaging plane of the image capture device 118. Therefore, even though the object may be placed in a plane that is at an angle in relation to an imaging plane of the image capture device 118, the image 202 may be corrected to appear as if the object 120 was parallel as illustrated by the image 202 in FIG. 2.

In another example, the image capture module 116 is illustrated as including a depth correction module 208. The depth correction module 208 is representative of functionality of the computing device 102 to correct depth, automatically and without user intervention. For example, the depth correction module 208 may employ zooming techniques to "fill" the image 202 of the object 120. A variety of other examples are also contemplated. Although this system 200 described display of the image 202 on the second display device 112, the first display device 108 may also be employed to display an image of the object 120, an example of which may be found in relation to the following figure.

Figure 3:
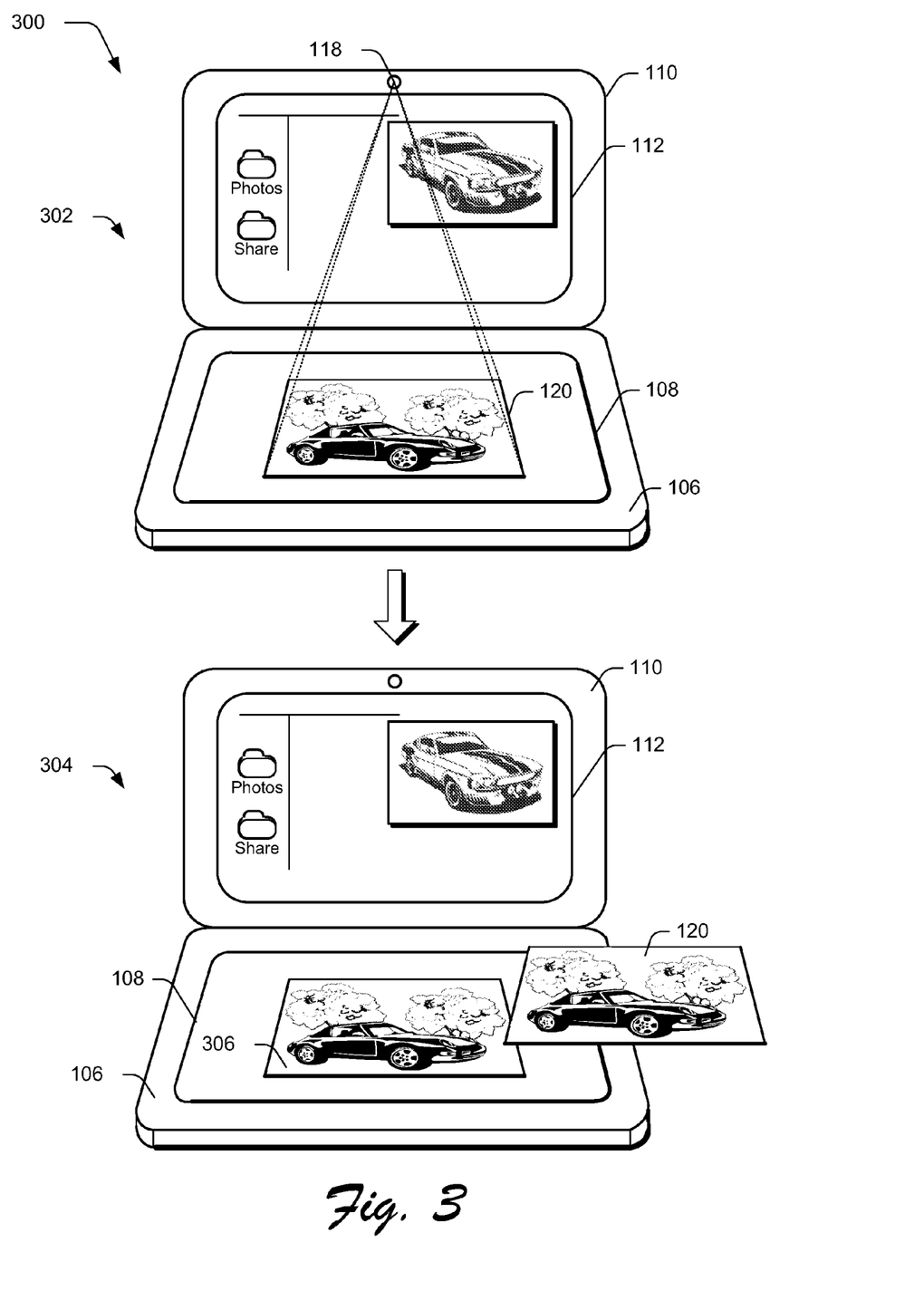
FIG. 3 is an illustration of an example system in which an image captured of an object disposed on a first display device of the computing device of FIG. 1 is also displayed by the first display device.

FIG. 3 depicts a system 300 in an example implementation in which an image captured of an object disposed on a first display device of the computing device of FIG. 1 is also displayed by the first display device. The example system 300 includes first and second stages 302, 304 of an image capture scenario. In the first stage 302, the object 120 is placed on a surface of the first display device 108. The image capture device 118 is also illustrated (through the use of phantom lines) as capturing an image of the object 120.

In the second stage 304, the image 306 captured in the first stage 302 is displayed by the first display device 108 of the first housing 106. In one or more implementations, the image 306 has a size and position that approximates "where" the object 120 was placed on the first display device 108 when the image 306 was captured. Thus, after the object 120 is moved away as illustrated in the second stage 304, the image 306 appears to "remain behind" on the first display device 108.

It should be readily apparent that this is but one of a variety of contemplated examples and further that the examples described herein may be combined (e.g., with a real time preview of FIG. 2) or further separated. Although the previous examples have described capture of an image of an object placed on a surface of the first display device, the image may be captured in a variety of other ways, examples of which are discussed in relation to the following figures.

FIG. 4 depicts a system 400 in an example implementation in which a frame is projected outside of the computing device 102 of FIG. 1 to indicate an area within which an object is to be placed to capture an image of the object. As previously described, the first and second housings 106, 110 are positioned in a tripod posture in this example system 400. In this posture, the first display device 108 of the first housing 106 and the second display device (not shown) of the second housing 112 are positioned to display in a portrait mode. Additionally, a position angle between the display devices of the first housing 106 and the second housing 110 is less than one hundred and eighty degrees (180°). This display configuration resembles a book opened for reading (with the display devices acting as a cover of the book).

The computing device 102 is further illustrated as including a frame projection module 402. The frame projection module 402 is representative of functionality of the computing device 102 to project a frame 404 onto a surface outside of and adjacent to the computing device 102, such as a surface on which the computing device 102 is disposed. The frame 404 may be projected using a variety of different techniques, such as through use of one or more lasers positioned near the image capture device 118.

In implementations, the frame 404 is configured to indicate an area within which the object 120 is to be placed to capture an image of the object 120. In this way, a user may be readily informed as to a likely outcome of the image capture without looking through a viewfinder or even viewing a preview of the image that may be displayed on one or more of the first and second display devices 108, 112.

In at least one implementation, the frame 404 is adjustable by a user through interaction with one or more controls (e.g., physical and/or via a user interface) in size and/or shape. Accordingly, this information may be used by the image capture module 116 to indicate dimensions of an image that is desired by a user and capture an image having those dimensions. Additionally, this information may also be used to provide a variety of other functionality, such as skew correction, depth correction, and so on based on the projected frame 404. Although the computing device 102 is illustrated as projecting the frame 404 in a tripod posture, a variety of other postures may be assumed by the computing device 102 to project the frame 404 and capture an image 120.

FIG. 5 depicts a system 500 in an example implementation in which the computing device 102 of FIG. 1 is illustrated as assuming a presentation display posture and projecting a frame to indicate an area within which an image of an object may be captured. In a presentation display posture, the first and second housings, 106, 110 are positioned to display in approximate opposing directions. This display configuration can be used to display a previous of images captured within the frame 404 displayed on a surface, such as when the computing device 102 is placed on a desk, and/or provides a divider between users that are sitting across from each other. The first display 108 and the second display 112 can be positioned to display in a landscape mode as illustrated in this example.

Figure 6:
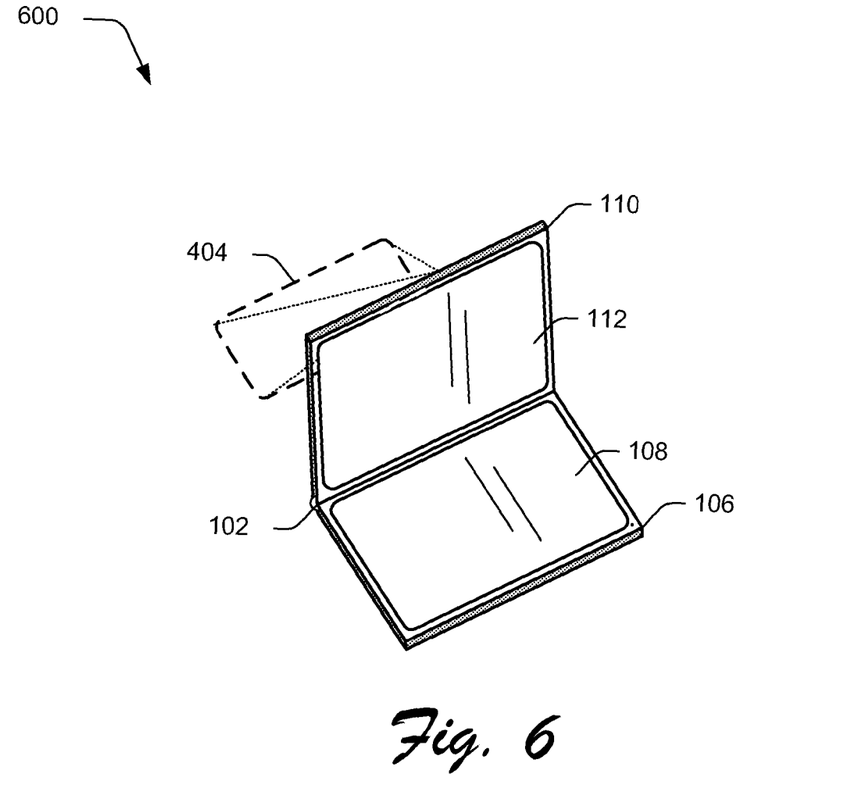
FIG. 6 is an illustration of an example system in which the computing device of FIG. 1 is illustrated as assuming a laptop posture and projecting a frame to indicate an area within which an image of an object may be captured.

FIG. 6 is an illustration of an example system 600 in which the computing device of FIG. 1 is illustrated as assuming a laptop posture and projecting a frame to indicate an area within which an image of an object may be captured. In this example, the frame 404 is projected on a surface and is positioned at a side of the second housing 110 that is opposite to a side at which the second display device 112 is arranged. A variety of other postures of the computing device 102 and arrangements of the frame 404 are also contemplated without departing from the spirit and scope thereof.

Example Procedures

The following discussion describes image capture techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-600 of FIGS. 2-6.

Figure 7:
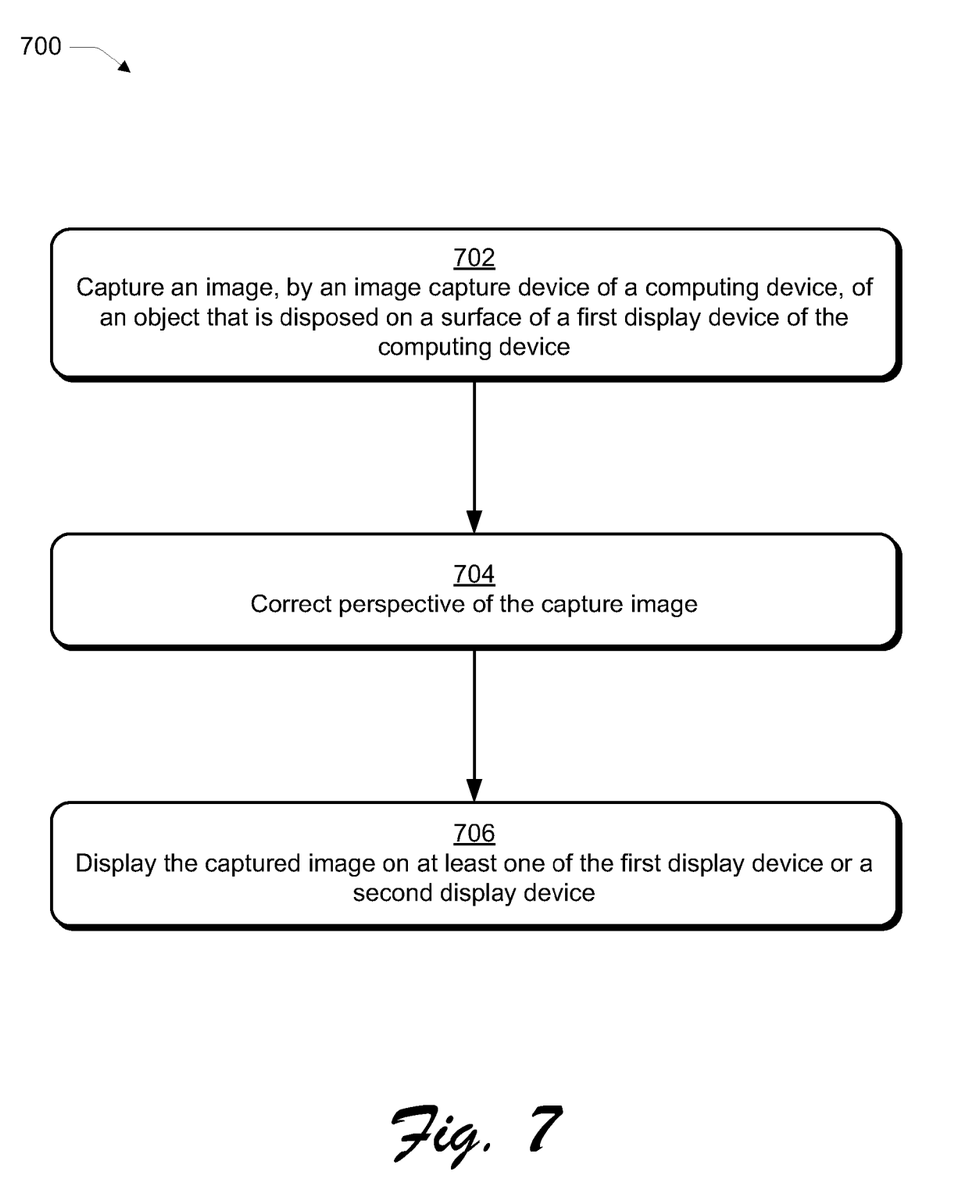
FIG. 7 is a flow diagram depicting a procedure in an example implementation in which an image is captured of an object disposed on a display device of a computing device.

FIG. 7 depicts a procedure 700 in an example implementation in which an image is captured of an object disposed on a display device of a computing device. An image is captured, by an image capture device of a computing device, of an object that is disposed on a surface of a first display device of the computing device (block 702). For example, the object 120 may be placed on a surface of the first display device 108 while the computing device is in a laptop posture.

Perspective of the captured image is corrected (block 704). The image capture modules 116, for instance, may employ a skew correction module 206 to correct skew, a depth correction module 208 to correct depth, and so on.

The captured image is displayed on at least one of the first display device or a second display device (block 706). As shown in FIG. 2, for instance, the captured image 202 may be displayed as part of a real time preview on the second display device 112. As shown in FIG. 3, the image 306 may be displayed to "remain behind" on the first display device 108. A variety of other examples are also contemplated, such as display on the first or second display devices 108, 112 when in other postures, such as those shown in FIGS. 4-6.

Figure 8:
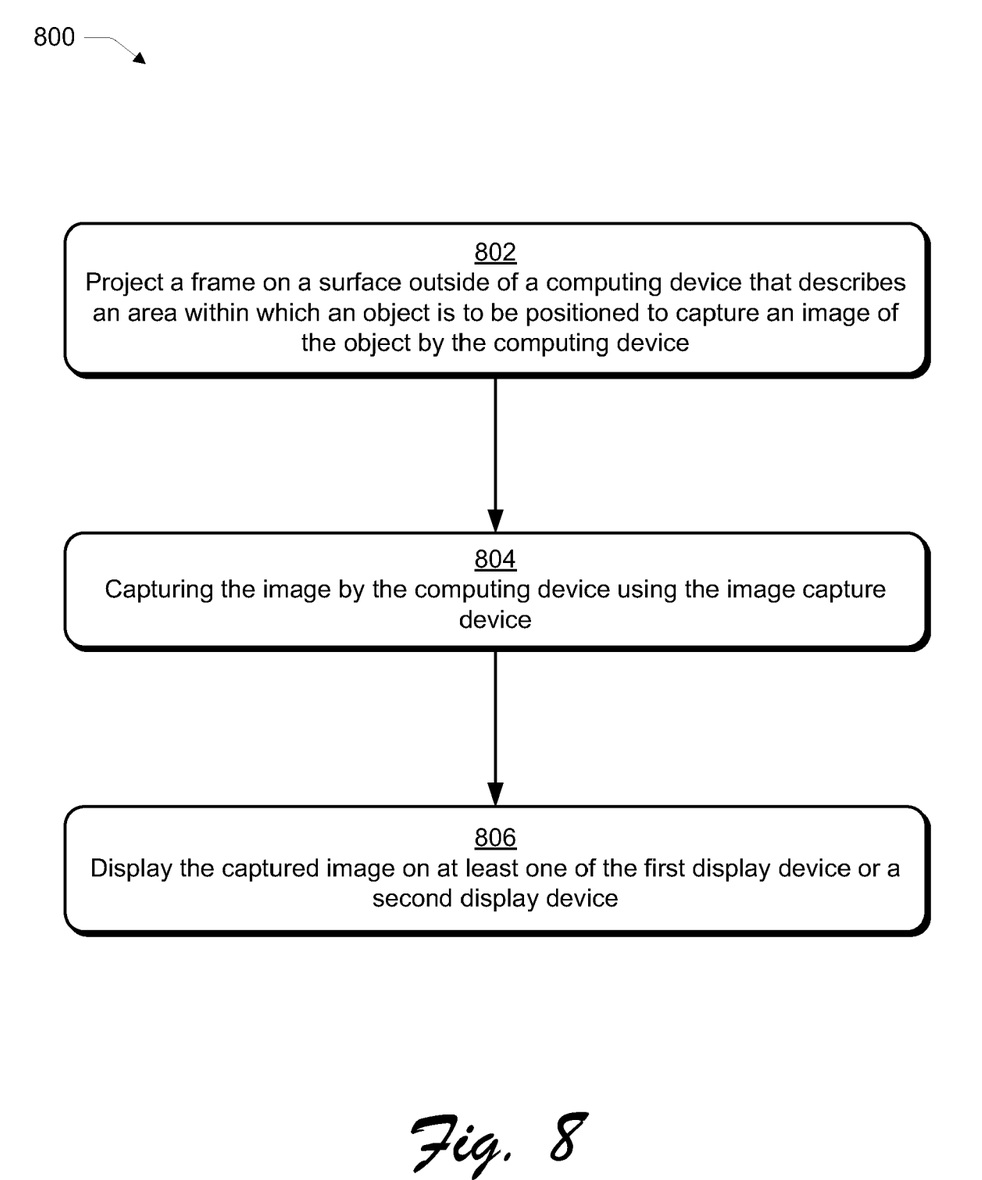
FIG. 8 is a flow diagram depicting a procedure in an example implementation in which a frame is projected to indicate an area within which an image of an object may be captured.

FIG. 8 depicts a procedure 800 in an example implementation in which a frame is projected to indicate an area within which an image of an object may be captured. A frame is projected on a surface outside of a computing device that describes an area within which an object is to be positioned to capture an image of the object by the computing device (block 802). For example, the computing device 102 may be arranged in the tripod posture of FIG. 4, the presentation posture of FIG. 5, the laptop posture of FIG. 6, and so on. The surface may include a surface upon which the computing device 102 is positioned, an adjacent surface, and so forth.

The image is captured by the computing device using the image capture device (block 804). The captured image is then displayed on at least one of the first display device or a second display device (block 806). As before, the image may be displayed in a variety of different ways, such as a preview (e.g., in real time), when captured to memory of the computing device 102, and so on. Although these techniques were described in relation to a dual screen device, it should be readily apparent that a wide variety of device configurations are contemplated, such as a single screen device.

Example Device

Figure 9:
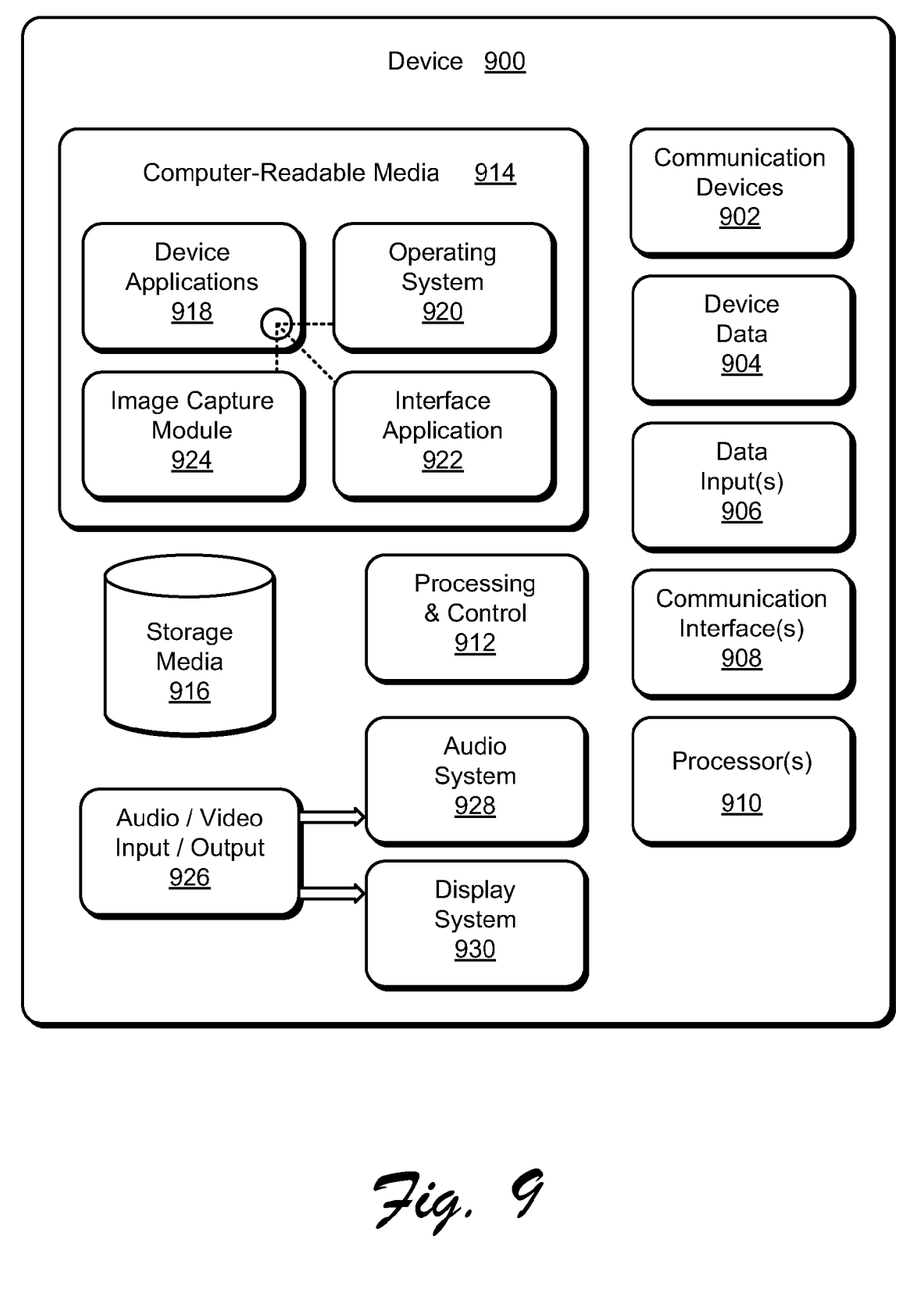
FIG. 9 illustrates various components of an example computing device in greater detail.

FIG. 9 illustrates various components of an example computing device 900 that can be implemented as any type of portable and/or computer device as described with reference to FIGS. 1-6 to implement embodiments of the image capture techniques described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface (e.g., wireless to the stylus 110), a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable instructions to control the operation of device 900 and to implement embodiments of image capture control. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the techniques described herein. In this example, the device applications 918 include an interface application 922 and an image capture module 924 that are shown as software modules and/or computer applications. The image capture module 924 is representative of software that is used to capture an image as previously described. Alternatively or in addition, the interface application 922 and the image capture module driver 924 can be implemented as hardware, software, firmware, or any combination thereof. Additionally, the image capture module driver 924 may be configured to support multiple input devices, such as separate devices to capture images for video conferencing and images of objects, respectively.

Device 900 also includes an audio and/or video input-output system 926 that provides audio data to an audio system 928 and/or provides video data to a display system 930, e.g., may be configured to include the image capture device. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    capturing an image, by an image capture device of a computing device, of an object that is disposed at a position on a surface of a display device of the computing device, the computing device having:
        a first housing that includes the display device; and
        a second housing that is rotatable attached to the first housing and that includes the image capture device; and
    displaying the captured image on the display device at the position on the display device at which image of the object is captured.

2. A method as described in claim 1, wherein the displaying is performed such that the displayed captured image is displayed as having a size that generally matches a size of the object.

3. A method as described in claim 1, wherein the displaying is performed such that the displayed captured image is displayed on a second display device included in the second housing.

4. A method as described in claim 3, wherein the displaying includes a real-time preview that is provided as the object is positioned on the surface of the first display device.

5. A method as described in claim 1, further comprising correcting perspective of the captured image by the computing device.

6. A method as described in claim 5, wherein the perspective is corrected such that the captured image appears to have been captured at a plane that is parallel to an imaging plane of the image capture device.

7. A method as described in claim 1, further comprising correcting depth of the captured image by the computing device.

8. One or more computer storage media having stored thereon multiple instructions execution of which cause one or more processors of a computing device to:
    capture an image, by an image capture device of the computing device, of an object that is disposed at a position on a surface of a display device of the computing device, the computing device having:
        a first housing that includes the display device; and
        a second housing that is rotatable attached to the first housing and that includes the image capture device; and
    display the captured image on the display device at the position on the display device at which image of the object is captured.

9. One or more computer storage media as recited in claim 8, wherein the displaying is performed such that the displayed captured image is displayed on a second display device included in the second housing.

10. A computing device comprising:
    a first housing that includes a display device;
    a second housing that is rotatable attached to the first housing and that includes an image capture device; and
    one or more modules that are disposed within at least one of the first or second housing, the modules configured to:
        capture an image, by the image capture device included in the second housing of the computing device, of an object that is disposed at a position on a surface of the display device of the computing device; and
        display the captured image on the display device included in the first housing at the position on the display device at which image of the object is captured.

11. A computing device as described in claim 10, wherein the one or more modules are further configured to correct perspective of the captured image.

12. A computing device as described in claim 11, wherein the perspective is corrected such that the captured image appears to have been captured at a plane that is parallel to an imaging plane of the image capture device.

13. A computing device as described in claim 10, wherein the image is captured, at least in part, by projecting, via the image capture device, a frame on a surface outside of the computing device that describes an area within which an object is to be positioned to capture the image of the object.

14. A computing device as described in claim 13, wherein the projecting is performed using a laser of the computing device.

* * * * *